(12) United States Patent
Gilbert (10) Patent No.: US 8,452,265 B2
(45) Date of Patent: *May 28, 2013

(54) SYSTEMS AND METHODS FOR AUDIO REMINDER MESSAGES

(75) Inventor: Lanny Gilbert, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,235

(22) Filed: Aug. 28, 2012

(65) Prior Publication Data

US 2012/0322417 A1    Dec. 20, 2012

Related U.S. Application Data

(63) Continuation of application No. 10/916,739, filed on Aug. 12, 2004, now Pat. No. 8,270,949, and a continuation of application No. 09/873,681, filed on Jun. 4, 2001, now Pat. No. 6,993,324, and a continuation of application No. 09/747,401, filed on Dec. 22, 2000, now abandoned.

(51) Int. Cl.
*H04M 1/725* (2006.01)

(52) U.S. Cl.
USPC .................................. 455/412.1; 455/412.2

(58) Field of Classification Search
USPC ........................................ 455/412.1, 412.2
See application file for complete search history.

(56) References Cited

U.S. PATENT DOCUMENTS

| | | | |
|---|---|---|---|
| 4,677,655 A | 6/1987 | Hashimoto | |
| 5,003,577 A | 3/1991 | Ertz et al. | |
| 5,481,595 A | 1/1996 | Ohashi et al. | |
| 5,598,463 A | 1/1997 | Saccardo et al. | |
| 5,722,067 A | 2/1998 | Fougnies et al. | |
| 5,794,142 A | 8/1998 | Vanttila et al. | |
| 5,995,824 A | 11/1999 | Whitfield | |
| 6,029,063 A | 2/2000 | Parvulescu et al. | |
| 6,104,790 A | 8/2000 | Narayanaswami | |
| 6,178,322 B1 * | 1/2001 | Creech | 455/412.2 |
| 6,182,041 B1 | 1/2001 | Li et al. | |
| 6,222,909 B1 | 4/2001 | Qua et al. | |
| 6,256,735 B1 | 7/2001 | Maria | |
| 6,304,573 B1 | 10/2001 | Hicks, III | |
| 6,351,523 B1 | 2/2002 | Detlef | |
| 6,377,822 B1 | 4/2002 | Grimes | |
| 6,393,274 B1 | 5/2002 | Peltonen | |
| 6,510,208 B1 | 1/2003 | Komiya | |
| 6,771,949 B1 | 8/2004 | Corliss | |
| 6,868,142 B2 | 3/2005 | Gupta et al. | |
| 6,909,780 B1 | 6/2005 | Hu et al. | |
| 7,032,030 B1 | 4/2006 | Codignotto | |
| 7,502,448 B1 | 3/2009 | Elman et al. | |

(Continued)

*Primary Examiner* — Nathan Mitchell
(74) *Attorney, Agent, or Firm* — Cantor Colburn LLP (57) ABSTRACT

Systems and methods use mobile telephones as input devices for recording audio messages on a server. A user inputs a first feature code into the mobile telephone and the feature code is sent to a mobile switching center (MSC). The MSC maps the feature code to a server and forwards the feature code and a user identification to the server. Once the mobile telephone is connected to the server, the user can record his audio message. The user can later retrieve the recorded audio message by inputting a second feature code into the mobile telephone. The second feature code is also assigned to the server. The recorded message is played after the mobile telephone is connected to the server.

7 Claims, 6 Drawing Sheets

U.S. PATENT DOCUMENTS

| | | |
|---|---|---|
| 7,660,207 B1 | 2/2010 | Treyz et al. |
| 2001/0029175 A1 | 10/2001 | Sellen et al. |
| 2001/0041590 A1 | 11/2001 | Silberfenig et al. |
| 2008/0095332 A1 | 4/2008 | Myers et al. |

* cited by examiner

SYSTEMS AND METHODS FOR AUDIO REMINDER MESSAGES

CROSS-REFERENCE TO RELATED APPLICATIONS

This application is a continuation of U.S. patent application Ser. No. 10/916,739 filed Aug. 12, 2004, the contents of which are incorporated by reference herein in their entirety, which is a continuation of U.S. patent application Ser. No. 09/873,681 filed Jun. 4, 2001, now U.S. Pat. No. 6,993,324, the contents of which are incorporated by reference herein in their entirety, which is a continuation of U.S. patent application Ser. No. 09/747,401 filed Dec. 22, 2000, now abandoned, the contents of which are incorporated by reference herein in their entirety.

FIELD OF THE INVENTION

The present invention relates to systems and methods for providing audio messages and, more particularly, to systems and methods for providing audio reminder messages in wireless communications devices.

BACKGROUND OF THE INVENTION

New technology development makes life easier and busier at the same time. Now we accomplish more in one day than what we used to accomplish in one week years ago. We can perform our tasks more efficiently, and we are constantly expected to outperform ourselves. It is common for a person to handle multiple tasks at the same time, and the person switches from one task to another several times a day. A person is constantly involved either physically or mentally with his work. A solution for a work project may come to a person while he is at home or driving his automobile, and he may want to interrupt the activity that he was involved in to take action on the solution before it is forgotten. However, it is not always possible to interrupt one's activity and switch to a new activity. Sometimes, it is better just to record the idea and act on it later.

Several products are now available for helping a person to record short audio messages as reminders for later retrieval. These devices are individual electronic gadgets that a person has to carry with him. However, people are already carrying enough electronic gadgets, such as cell phones, pagers, and personal digital assistant (PDA) and are generally reluctant to carry more electronic devices. Another way a person may record a reminder message for himself is to use his mobile telephone, if he subscribes to the voice mail service. The person can dial his own number and leave a message in his own voice mailbox. However, this approach requires the person to dial his own telephone number, listen to the ringing, be connected to the voice mailbox, listen to the greetings, and finally record his message.

SUMMARY OF THE INVENTION

A preferred embodiment of the present invention provides a user who has access to a mobile telephone to use the mobile telephone to record an audio message for later retrieval. The user employs the mobile telephone as an input device, and records a message on a server that is attached to the public switched telephone network (PSTN). The mobile telephone is in communication with a wireless network through radio frequency transmission. A feature code for recording sent by the mobile telephone is received by a base station (BS) and forwarded to a mobile switching center (MSC). The MSC performs the code analysis and maps the code to a destination number supported by the server. The feature code and the user's calling number are routed to the server. The server analyzes the feature code and interprets it as a request to record an audio message. The server proceeds to connect the user's mobile phone to a user message box the server. The user can record the message, and the recording will stop when the user hangs up. The recording can also be stopped when the server detects no activity for a designated period of time.

In this preferred embodiment, the user's telephone number is used for identifying the user's message box, and the feature code is used for identifying the function to be performed by the server. Upon receiving the feature code and the user's telephone number, the server requests a telephone connection to be set up between the user's mobile telephone and the user's message box.

The user starts the recording process by inputting a first feature code into his mobile telephone. This first feature code does not resemble a regular telephone number, and it can be "*12" or any other string. The mobile telephone sends the first feature code through radio frequency transmissions to a BS, and the BS transmits the first feature code to a MSC. The MSC checks the first feature code and maps it to a first destination number that is assigned to an application residing on a server. The MSC sends the first feature code along with the user's telephone number to the server. The application checks the user's telephone number and recognizes it as belonged a subscriber for the audio message service. The application then connects the user's telephone to the server. Once the telephonic connection is established, the user can record an audio message without listening to any greeting messages or pressing any additional command codes. The recording will stop when user hangs up or when there is no activity for a period of time.

When the user wants to retrieve his recorded messages, he inputs a second feature code into his mobile telephone. This second feature code is transmitted to the MSC in a manner similar to the above-mentioned transmission of the first feature code. Similar to what has been described above, the second feature code is mapped to a second destination telephone number assigned to the application on the server, and the user's telephone is connected to the server. The user can then retrieve previously recorded audio messages and is provided with an option to delete these audio messages.

In another preferred embodiment, the user has the option of forwarding a recorded audio message to other subscribers. The user has the option to record additional messages if the user inputs another predefined codes.

Other features and advantages of the present invention will become apparent upon reading and understanding this specification, taken in conjunction with the accompanying drawings.

DESCRIPTION OF THE DRAWINGS

The foregoing and other objects, aspects, and advantages will be better understood from the following detailed description of a preferred embodiment of the invention with reference to the drawings, in which.

DETAILED DESCRIPTION OF THE INVENTION

In a system according to the present invention, a subscriber can use his mobile telephone to record an audio reminder message for later retrieval. The audio reminder message is recorded at a server that is accessible through a wireless network and a landline network. The subscriber requests access to the audio reminder message by dialing a feature code into his mobile telephone, and this feature code is sent to a mobile switching center (MSC) of a wireless network. The MSC then routes the user's request through a public switched telephone network (PSTN) to a server that supports the audio reminder feature. The subscriber can record messages in this server or retrieve previously recorded audio messages.

Figure 1:
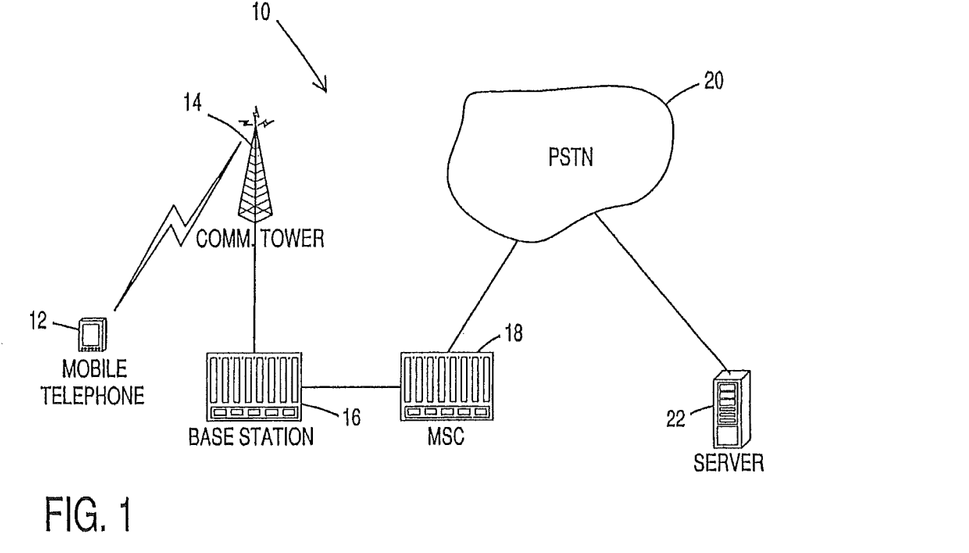
FIG. 1 is a schematic representation of a system supporting audio message features in accordance to the present invention.

Referring now in greater detail to the drawings, in which like numerals represent like components throughout several views, FIG. 1 is a schematic representation of a system 10 that supports audio messages in accordance with the present invention. The system 10 has a mobile telephone 12 in communication with a communication tower 14, which is connected to a base station 16. The base station 16 links to a mobile switching center (MSC) 18 that connects to a public switched telephone network (PSTN) 20. A server 22 is connected to the PSTN 20.

The above system 10 allows a service provider to provide audio reminder messages to subscribers who use mobile telephones 12, A subscriber, who wants to record an audio reminder message, dials a feature code on his mobile telephone 12, and the feature code together with his mobile telephone's mobile identification (MIN) code are transmitted to a communication tower 14, then to a base station 16. The base station 16 forwards the feature code and the MIN to a MSC 18, where the feature code is analyzed. The MSC 18 identifies a server 22 that supports the feature requested by the subscriber and forwards the feature code and MIN to the server 22. The server 22 then validates the subscriber and the feature code and provides the appropriate audio reminder message services to the subscriber. By way of example and not intended to be limited by, recording, retrieving, and forwarding are among the audio reminder message services supported by the system 10.

Figure 2:
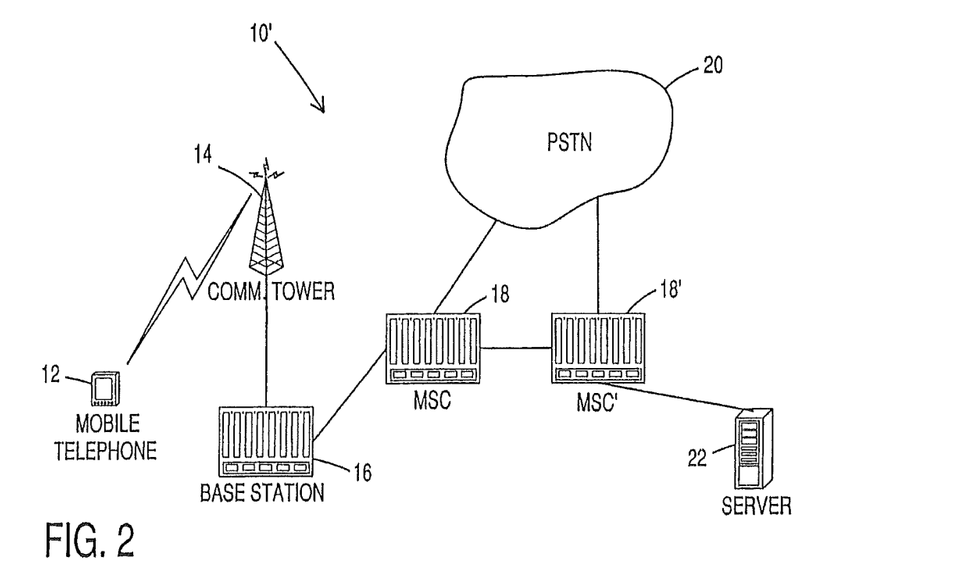
FIG. 2 is a schematic representation of an alternate embodiment of a system supporting the present invention.

In an alternate embodiment shown in FIG. 2, the system 10' shows the server 22 connected to a MSC' 18'. In this system 10' the server 22 is accessible directly through a MSC' 18" instead of the PSTN 20. The MSC 18 receives the feature code and MN and passes them directly to the MSC' 18' which then forwards them to the server 22.

The system 10 can be composed of a variety of components of different standards. The mobile telephone 12 can be either an analog telephone or a digital telephone, and the communication between the mobile telephone 12 and the base station 16 can follow any industry standard, such as TDMA (time division multiple access), CDMA (code division multiple access), GSM (Groupe Speciale Mobile/Global System for Mobile communication), or AMPS (Advanced Mobile Phone Service).

The subscriber can access the server 22 from either his home network or from a visitor system while he is roaming.

The MSC 18 can handle audio reminder message requests from a subscriber using a mobile telephone 12 in his home network or a roaming visitor. If the audio reminder message request is from a home subscriber, the request is routed to the server 22. If the audio message request is from a roaming mobile telephone 12, the MSC 18 preferably first finds the home network for the mobile telephone 12, such as through a visitor location register (VLR). Once the MSC 18 determines the visitor's home network, the MSC 18 routes the request to the server 22 of the roaming mobile telephone's 12 home network.

The server 22 can be operated by a mobile telephone service provider or by an independent third party subcontracting the audio reminder messages from a mobile telephone service provider. The server 22 can connect to the PSTN 20 as shown in FIG. 1 or to a MSC' 18' as shown in FIG. 2, and the MSC 18 determines how to route an audio reminder message request to the server 22. The server 22 has several software components and can be connected to different places in the network. The server 22 generally has the following software modules shown in FIG. 3: an audio server engine 30, a user authentication unit 32, a feature code validation unit 34, an audio message management unit 36, an audio message storage unit 38, and a subscriber database 40.

Figure 3:
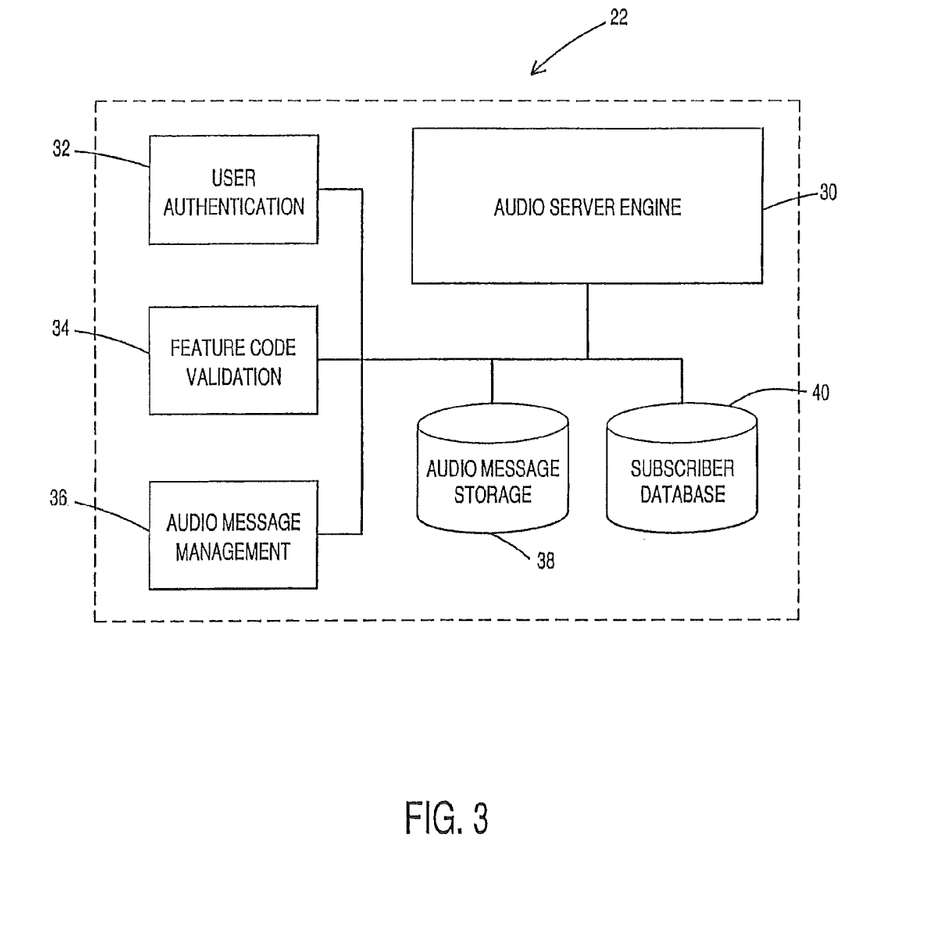
FIG. 3 is a bloc diagram of software modules in a server according to the present invention.

The audio server engine 30 interfaces with mobile telephones 12 and controls the operation of the server 22. The audio server engine 30 receives user identification and feature code from the user communication device (mobile telephone) and instructs other software components to validate the user and the feature code. The audio server engine 30 also receives audio messages from the user and passes them to the audio message management unit 36 for handling.

The user authentication unit 32 performs user validation. It receives the user identification information, checks the subscriber database 40, and validates the user if the subscriber database 40 has an entry for the user.

The feature code validation unit 34 verifies the feature code from the user.

The audio message management unit 36 handles audio messages according to instructions from the audio server engine 30. The audio message management unit 36 records audio messages from users, stores and retrieves the audio messages from the audio message storage unit 38, and sends the audio messages to user communication devices.

The audio message storage unit 38 stores audio messages recorded by users.

The subscriber database 40 stores information of all subscribers. Each subscriber has an entry containing his information, such as the user identification code and password.

The MSC 18 analyzes the audio reminder feature code that a subscriber dials into the mobile telephone 12 and determines if the feature access is supported. If the MSC 18 determines that the feature code is supported, then it determines which server supports the audio reminder message feature. After determining the server 22, the MSC 18 forwards the feature code and MIN to the server 22, and a telephonic connection is set up between the mobile telephone 12 and the server 22. This telephone connection set up procedure is well known to those skilled in the art and will not be repeated here.

Figure 4:
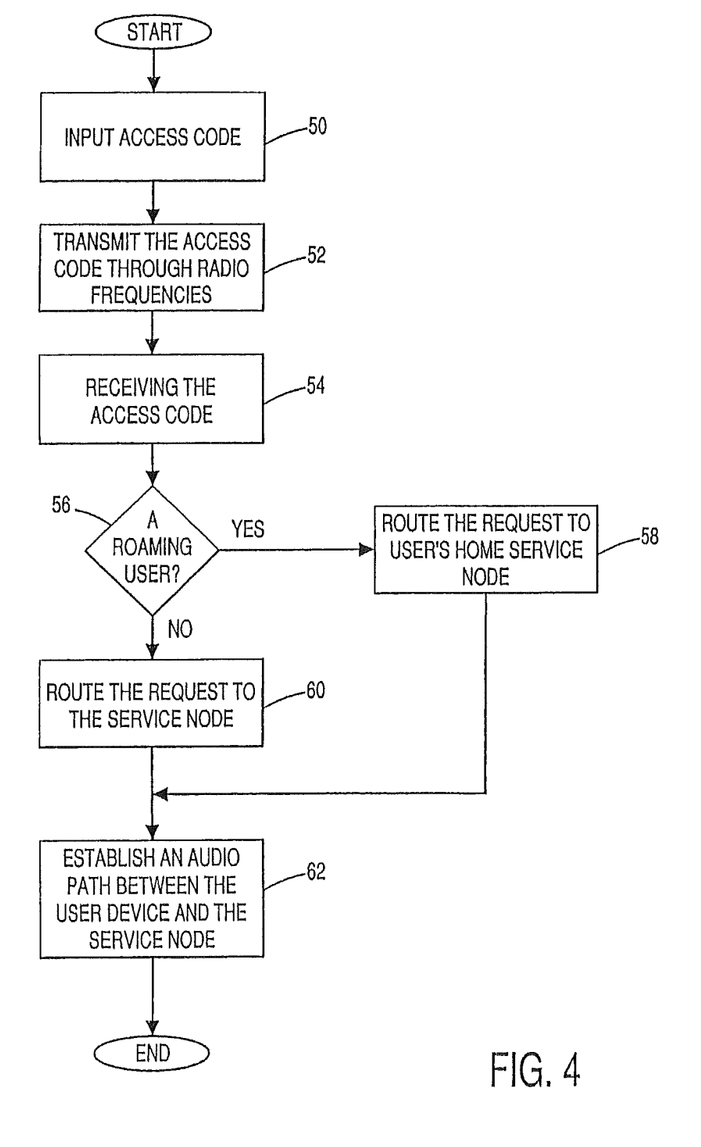
FIG. 4 is a flowchart of a process for accessing audio message features in a server.

FIG. 4 is a flowchart depicting an overall process for accessing an audio message feature. The process starts when a user inputs a predefined feature code into his mobile telephone 12 at 50. Different feature codes are defined for different audio message features. One feature code can be defined for recording an audio message, and another feature code can be defined for retrieving a recorded audio message. These feature codes are short and can have numbers preceded by "*" or "#" signs. In the preferred embodiment, the feature codes start with "*" sign and then have one or two numerical digits. The feature codes preferably do not resemble North America Numbering Plan (NANP) telephone numbers or any other number used as telephone numbers.

Once the feature code is entered, the user can press "send" to transmit the feature code through radio frequency transmission to a base station 14 at 52. The base station 14 transfers the feature code and the user information to a MSC 18. After receiving the feature code and the subscriber information at 54, the MSC 18 checks whether or not the user is a visitor roaming in the system at 56. If the user is a roaming visitor, the feature code (the audio message feature request) is routed to the user's home system at 58. If the user is not a roaming visitor, i.e. the user is a subscriber of the audio reminder message services, the MSC 18 sends the call to the server 22 with the feature code and the MIN for the mobile telephone 12. The call is routed to the server 22 at 60, and a telephonic connection is established between the user's mobile telephone 12 and the server 22 at 62.

Different feature codes are assigned to different functions on the server 22. Different feature codes provide the indication about which audio message function the subscriber wants to access. One feature code may mean the subscriber wants to record an audio message, and another feature code may mean the subscriber wants to retrieve a recorded audio message. The server 22 determines desired functions from the feature code in a manner that is transparent to the subscriber.

Figure 5:
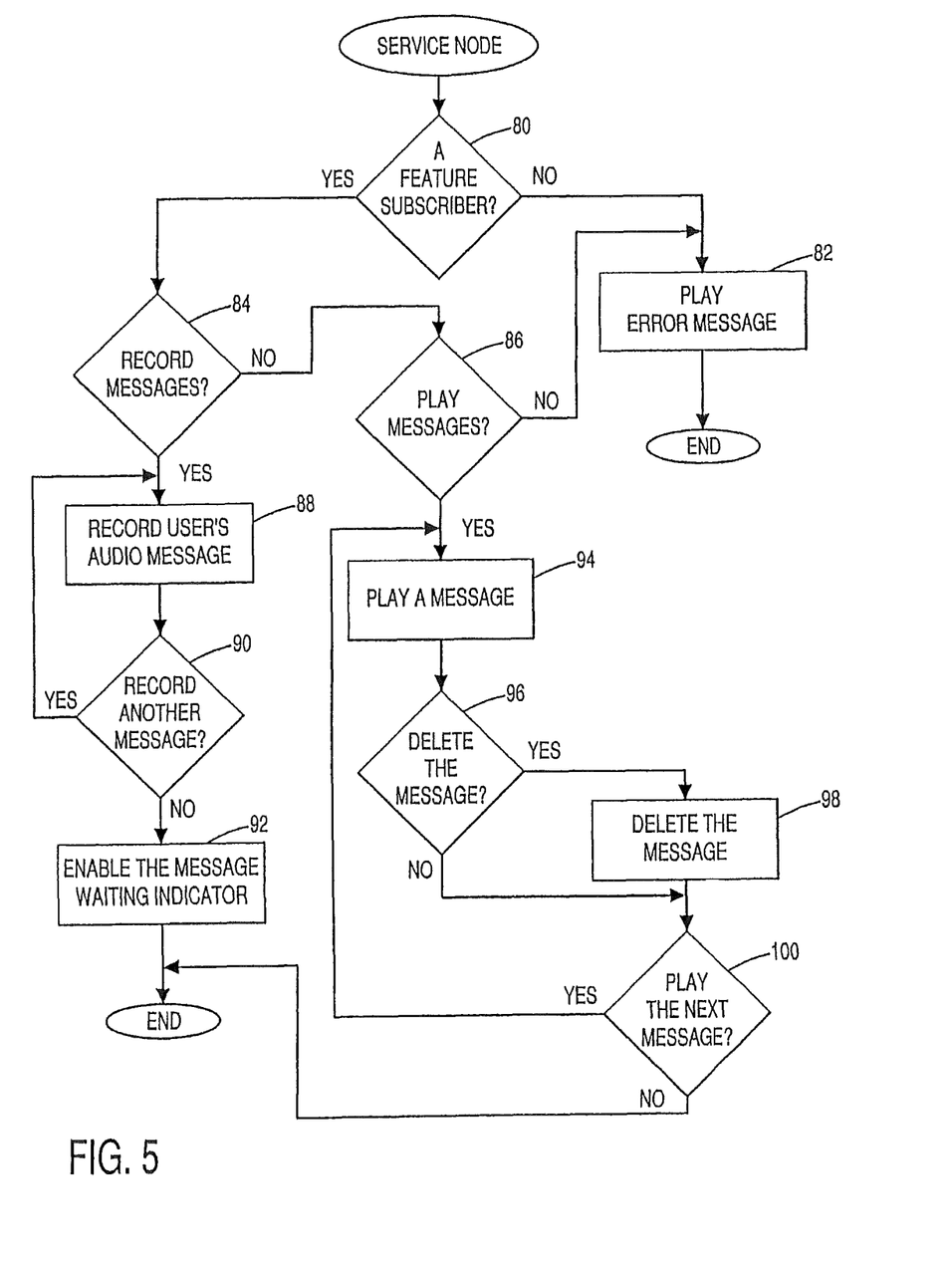
FIG. 5 is a flowchart of a server process that handles audio message requests.

FIG. 5 is a flowchart of a server process that handles audio message requests. This flowchart describes the process of a server, and it is the same whether or not the server is part of the home network system or part of a visitor's network system. The first thing the server does is to verify whether the user is a service subscriber at 80. The server identifies the user through the telephone number of the MIN assigned to the mobile telephone. The telephone number forms part of the feature request message that is sent to the server 22. If the user is not a subscriber, an error message is played at 82, and the server hangs up. If the user is a subscriber, then the server checks whether the user wants to record an audio message at 84, or plays a recorded audio message at 86. The server 22 identifies the requested audio message function by checking the feature code.

In one preferred embodiment, each feature code is assigned to a destination telephone number, and the server 22 identifies the user by the origination telephone number. The destination telephone number identifies the audio message function requested, and the destination number can be obtained through telephone switching features such as the dialed number identification service (DNIS). The origination telephone number is identified through the automatic number identification (ANI) sent by an origination switch connected to the MSC.

If the user input the feature code for recording an audio message, the user can record the audio message at 88, after the user's mobile telephone 12 is connected to the server 22. The recording stops when the user hangs up the telephone 12, or when the server 22 detects no activity on the incoming telephone line for a predefined time period. For example, the recording may stop if the user pauses in his dictation for more than two minutes. At the end of recording the user may be given the option of recording another message at 90. If the user chooses to record another message, then step 88 repeats. If the user chooses not to record another message, the user is disconnected and the communication path is torn down. The server 22 can instruct the user's mobile telephone to enable a message-waiting indicator, if the mobile telephone is so equipped at 92.

If a user input a feature code for retrieving previously recorded audio messages, the server 22 plays the recorded audio message for the user at 94, after the connection is established between the user's mobile telephone 12 and the server 22. After listening to the audio message, the user has the option to delete the message at 96, and the audio message is deleted if the user so chooses at 98. The user has also the option to listen to other audio messages at 100. If the user chooses to listen to other messages, then the step 94 repeats. Otherwise, the server 22 disconnects the user and the process ends.

Figure 6:
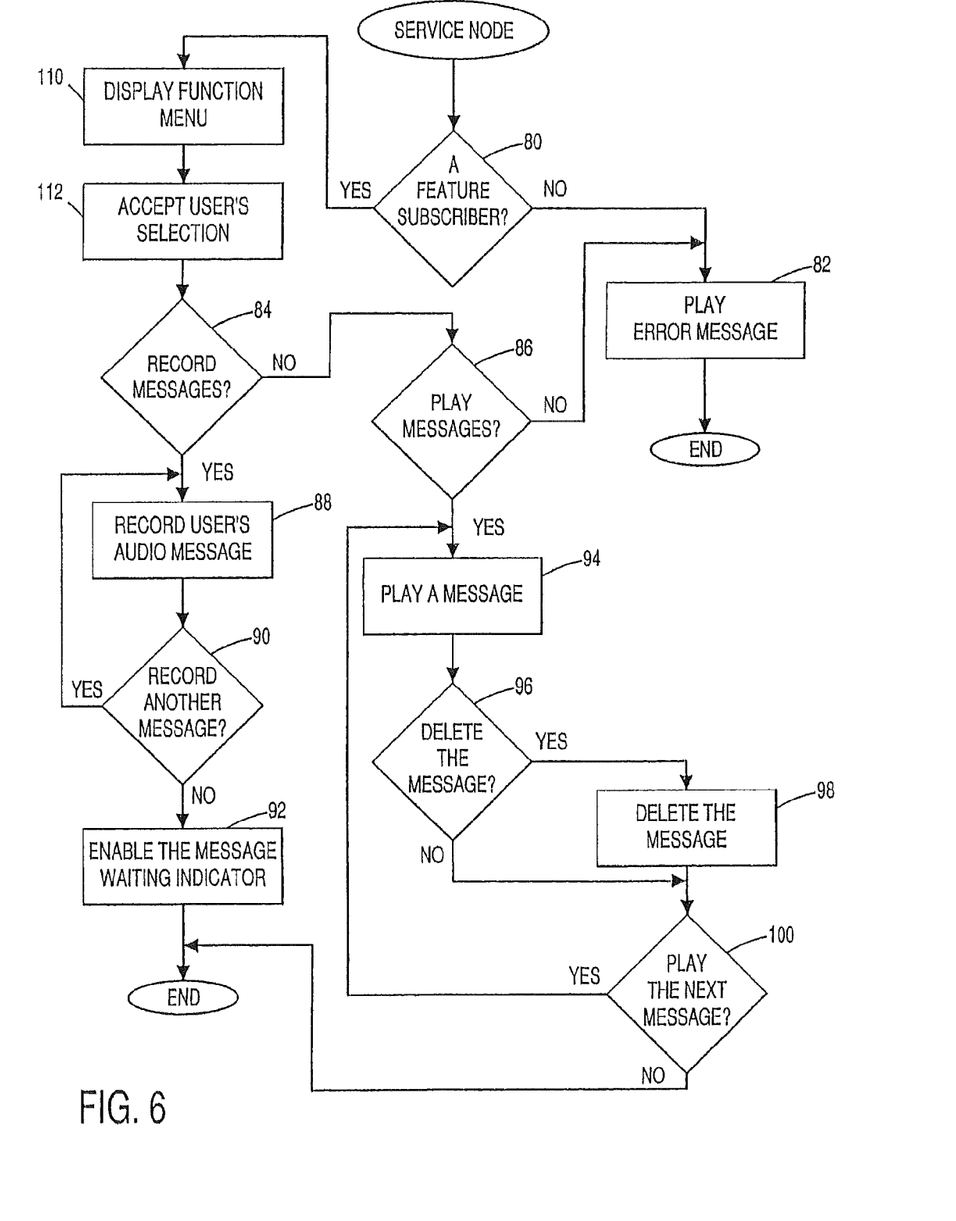
FIG. 6 is a flowchart of an alternate server process according to the present invention.

FIG. 6 is a flowchart of a server process according to an alternate embodiment of the present invention. In this alternate embodiment, the user accesses the audio message services through one single feature code. Once the user connects to the server 22, the server 22 checks whether or not the user is a subscriber at 80. If the user is a subscriber, the server 22 provides a function menu to the user's mobile telephone 12. The function menu can be either displayed at 110, on the mobile telephone's LDC screen or it can be an audio recording for playing on the mobile telephone 12. The user makes a selection, and the user's selection is transmitted back to the server 22. The server 22 accepts the user's selection at 112, and checks the user's selection for audio recording or audio retrieval. The server process for audio recording and audio retrieval is the same as described by FIG. 5.

Figure 7:
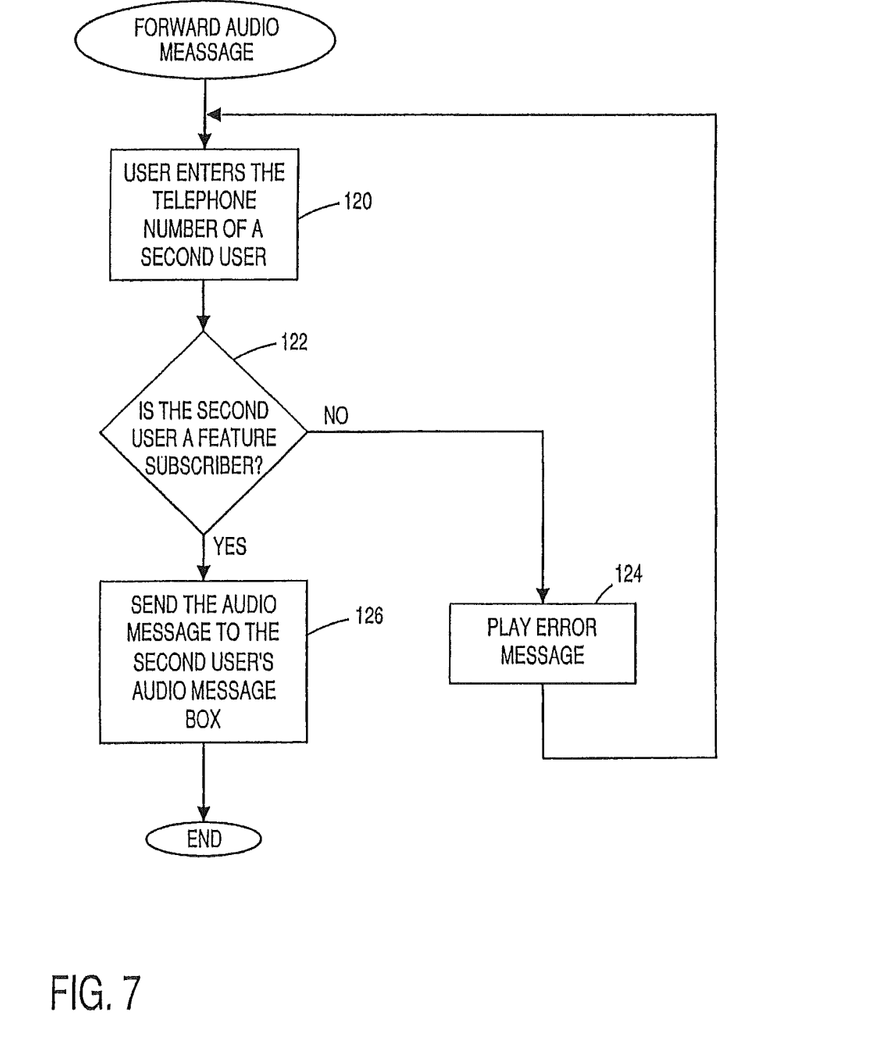
FIG. 7 is a flowchart of a process for forwarding audio messages to another subscriber.

In a further alternate embodiment shown in FIG. 7, a first user may be given the option of forwarding his recorded audio message to a second user's message box. The first user enters the telephone number of the second user at 120, and the server checks whether or not the second user is a subscriber of audio message services at 122. If the second user is not a subscriber, an error message is played for the first user at 124, and the first user may enter another telephone number. If the second user is a subscriber, the audio message is then delivered to the second user's message box at 126.

In yet another embodiment, a first user may forward his recorded audio message to a second user's message box through the Internet connections according to Voice Profile for Internet Messaging (VPIM) protocol. The first user enters the second user's telephone number, and the server 22 does a directory look-up to find the address information for the message box of the second user. The recorded message is routed to the destination message box through the Internet.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A method for recording, playing and forwarding an audio message, the method comprising:
   receiving a first feature code from a communication device over a network, the first feature code being a non-telephone number;
   receiving a user identification code from the communication device over the network;

determining if the user identification code identifies a subscriber to an audio message service;
wherein when the identification code does not identify a subscriber to the audio message service, playing an error message and disconnecting the communication device;
wherein when the identification code does identify a subscriber to the audio message service then:
routing the first feature code to a server;
establishing a communication path over the network between the communication device and the server;
validating the user in response to the user identification code;
upon validating, receiving the audio message from the communication device over the network;
providing the user with access to a personal audio storage area on an audio message storage unit remote from the communication device, wherein providing the user access to the personal audio storage area occurs directly without providing a greeting message and without requiring additional command codes from the user;
allowing the user to record the audio message in the personal storage area via the network, recording of the audio message being be stopped upon detecting no activity for a designated period of time;
receiving a second feature code from the communication device over the network, the second feature code different from the first feature code, the second feature code being a non-telephone number;
wherein when the identification code does identify a subscriber to the audio message service then:
routing the second feature code to the server;
establishing a communication path over the network between the communication device and the server;
validating the user in response to the user identification code;
providing the user with access to a personal audio storage area on an audio message storage unit remote from the communication device, wherein providing the user access to the personal audio storage area occurs directly without providing a greeting message and without requiring additional command codes from the user;
allowing the user to play an audio message stored in the personal storage area via the network;
receiving a third feature code from the communication device over the network, the third feature code being a non-telephone number different from the first feature code and the second feature code;
receiving a destination telephone number; and
determining if the destination telephone number corresponds to a second subscriber to the audio message service;
wherein when the destination telephone number does not identify a second subscriber to the audio message service, providing an option to enter another destination telephone number;
wherein when the destination telephone number does identify a second subscriber to the audio message service, forwarding the audio message to a personal audio storage area on the audio message storage unit associated with the destination telephone number.

2. The method of claim 1 further comprising:
transmitting a telephone number associated with the communication device to the server.

3. The method of claim 1 wherein receiving the user identification code comprises receiving a telephone number assigned to the communication device.

4. The method of claim 1 wherein the communication device is a mobile telephone.

5. The method of claim 1 wherein the network includes a wireless network.

6. The method of claim 1 wherein the network includes a public switched telephone network.

7. The method of claim 1 further comprising:
instructing the communication device to enable a message-waiting indicator.

* * * * *